United States Patent [19]
Makase

[11] Patent Number: 5,080,634
[45] Date of Patent: Jan. 14, 1992

[54] DRIVE SHAFT

[75] Inventor: Keiichirou Makase, Osaka, Japan

[73] Assignee: Koyo Seiko Co., Ltd., Osaka, Japan

[21] Appl. No.: 429,031

[22] Filed: Oct. 30, 1989

[30] Foreign Application Priority Data

Oct. 31, 1988 [JP] Japan .............................. 63-143354[U]

[51] Int. Cl.⁵ .............................. F16D 3/06; F16C 3/03
[52] U.S. Cl. ...................................... 464/169; 403/166
[58] Field of Search ................. 403/166; 464/117, 162, 464/169

[56] References Cited

U.S. PATENT DOCUMENTS

| | | | |
|---|---|---|---|
| 3,122,901 | 3/1964 | Thompson | 464/117 |
| 4,055,228 | 10/1977 | Holmes et al. | 464/117 X |
| 4,112,710 | 9/1978 | Okuda et al. | 464/169 |
| 4,136,532 | 1/1979 | Okuda | 464/117 X |
| 4,136,533 | 1/1979 | Okuda | 464/169 X |
| 4,162,618 | 7/1979 | Okuda | 464/169 |

FOREIGN PATENT DOCUMENTS 59-99122   6/1984   Japan .................................. 464/162

Primary Examiner—Lenard A. Footland
Assistant Examiner—William G. Battista, Jr.

[57] ABSTRACT

A drive shaft adapted for use in driving rolls of rolling mills and the like. It is assembled from a first tubular shaft connected on one end to a first joint member and a second tubular shaft connected on one end to a second joint member, the opposite ends of both shafts being coupled so as to transmit torque and slide axially, as well as a coiled spring assembly provided at the coupling section for biasing the two tubular shafts in axial opposition. The coiled spring assembly has a plurality of coiled spring units and at least one spacer member which is interposed between the two coiled spring units and has a pair of receiving portions into which the ends of the two coiled spring units are fitted so that the two coiled spring units are kept out of contact with the inner peripheral surface of one of the two tubular shafts forming the coupling section and an outer contact portion of each spacer member held in contact with the inner peripheral surface of the one tubular shaft. The use of a plurality of radially positioned coiled spring units limits the flexure of the coiled spring assembly, so that during rotational motion the coiled spring assembly does not collide with the inner peripheral surface of the tubular shafts, thereby preventing generation of noise and vibration.

5 Claims, 2 Drawing Sheets

DRIVE SHAFT

BACKGROUND OF THE INVENTION

This invention relates to a drive shaft adapted for use in driving rolls of rolling mills and the like, and more particularly, to a drive shaft whose two tubular shafts are telescopically coupled together so as to transmit torque and to slide axially with an attached structure of a coiled spring acting to bias the two axially opposed tubular shafts.

A conventional drive shaft of the above type is disclosed in FIG. 4 of Japanese Utility Model Publication No. 55-16188. This drive shaft is configured such that a tubular shaft made integral with a first joint member is telescopically spline-fitted/coupled with another tubular shaft made integral with a second joint member and a coiled spring is provided inside the inner tubular shaft in the spline-fitted section. With the drive shaft thus configured, torque is transmitted from the first joint member to the second joint member via the spline-fitted portions of the two tubular shafts. To accommodate a variation in the distance between the first joint member and the second joint member during torque transmission, the tubular shafts are made axially slidable. The coiled spring is wound around a positioning guide bar provided inside the inner tubular shaft so that its outer peripheral surface faces the inner peripheral surface of the inner tubular shaft. Both ends of the coiled spring are held in contact with the respective base portions of the two tubular shafts so that the two tubular shafts are biased in axial opposition with the result that the two tubular shafts are stably retained in place. Since it is difficult to make the coiled spring in the form of one long element, two spring segments are used to form the coiled spring and a spacer ring is interposed between them.

In the foregoing drive shaft wherein the coiled spring is guided by the inner peripheral surface of the inner tubular shaft and the outer peripheral surface of the guide bar, flexure arises on the coiled spring during rotational motion because of the presence of a radial gap in the guide section. Thus, the coiled spring severely collides with the tubular shaft and/or the guide bar, resulting in a problem of significant noise and/or vibration being generated.

U.S. Pat. No. 4,112,710 and U.S. Pat. No. 4,136,532 also disclose drive shafts including coiled springs. That is, U.S. Pat. No. 4,112,710 teaches a coiled spring which is made of two spring segments connected together and disposed in conjunction with a guide bar as is the case of the abovementioned prior art. As a result, the coiled spring undergoes flexure during rotational motion and collides with a tubular shaft, resulting in a problem of significant noise and/or vibration being generated. U.S. Pat. No. 4,136,532 teaches one coiled spring of moderate length which is disposed around a tube and guided thereby. As a result, the coiled spring undergoes flexure during rotational motion and collides with a tubular shaft and the tube, resulting in a problem of significant noise and/or vibration being generated.

SUMMARY OF THE INVENTION

It is an object of the present invention to provide a drive shaft including a coiled spring which during rotational motion cannot undergo flexure, collide with the tubular shafts and the guide bar, and generate noise and vibration.

A drive shaft according to the present invention comprises a first joint member, a first tubular shaft connected on one side with the first joint member, a second joint member, a second tubular shaft connected on one side with the second joint member and coupled on the other side with the other side of the first tubular shaft so as to transmit torque and slide axially, and coiled spring means provided in the coupling section of the two tubular shafts for biasing the two tubular shafts in other axial opposition and the coiled spring means is composed of a plurality of coiled spring units and at least one spacer member, the spacer member is interposed between two coiled spring units, and the spacer member has a pair of receiving portions into which the ends of the coiled spring units are fitted so that the coiled spring units are kept out of contact with the inner peripheral surface of one of the two tubular shafts forming the coupling section and an outer contact portion of the spacer member held in contact with the inner peripheral surface of the tubular shaft.

According to the present invention, the spring section of the coiled spring means is divided into a plurality of coiled spring units so that each coiled spring unit is short. Hence, the amount of flexure of each coiled spring unit is limitedly small. The spacer member has the outer contact portion defined so as to contact with the inner peripheral surface of the one tubular shaft, so that it is radially positioned inside the one tubular shaft, and the spacer member thus positioned has the receiving portions into which the ends of the coiled spring units are fitted. Thus, the coiled spring units are held out of contact with the one tubular shaft, so that the individual coiled spring units are radially positioned, while keeping a given gap with respect to the inner peripheral surface of the one tubular shaft.

In this way, the coiled spring means is configured so that the short coiled spring units are coupled together and radially positioned by the spacer member. The total amount of flexure of the coiled spring means is thereby limited, and each coiled spring unit is positioned such that it is held out of contact with the inner peripheral surface of the tubular shaft. Accordingly, during rotational motion the coiled spring means undergoing any flexure is prevented from colliding with the inner peripheral surface of the tubular shaft and the like, resulting in no generation of significant noise and vibration during rotational motion.

The spacer member consists, for example, of a cylindrical body and an annular protrusion projecting radially outward from a central portion of the outer peripheral surface of the cylindrical body, so that the receiving portions are defined by cylindrical edge portions of the outer peripheral surface of the cylindrical body that are located on both sides of the annular protrusion, and the outer contact portion is defined by the outer peripheral surface of the annular protrusion. Where the annular protrusion is made wide, the spacer member can be stably positioned inside the tubular shaft.

To increase the width of the annular protrusion, the spacer member may be made of a cylindrical body such that the outer contact portion is defined by the whole outer peripheral surface of the cylindrical body. In this case, the cylindrical body is formed in its side surfaces with annular grooves whose cylindrical inner spaces serve as the receiving portions, whereby the individual coiled spring units can be satisfactorily positioned.

Since the outer peripheral surface of the spacer member slides on the inner peripheral surface of the tubular shaft, it is preferable to provide a metallic member made of aluminum bronze or the like on that outer peripheral surface to enhance slidability.

Further, the spacer member may be fitted on a guide bar to ensure stability. In such case, the outer contact portion of the spacer member is made narrow and a metallic member providing a slide efficiency is provided on the inner peripheral surface of the spacer member being kept in contact with the guide bar.

DETAILED DESCRIPTION OF THE PREFERRED EMBODIMENTS

Figure 1:
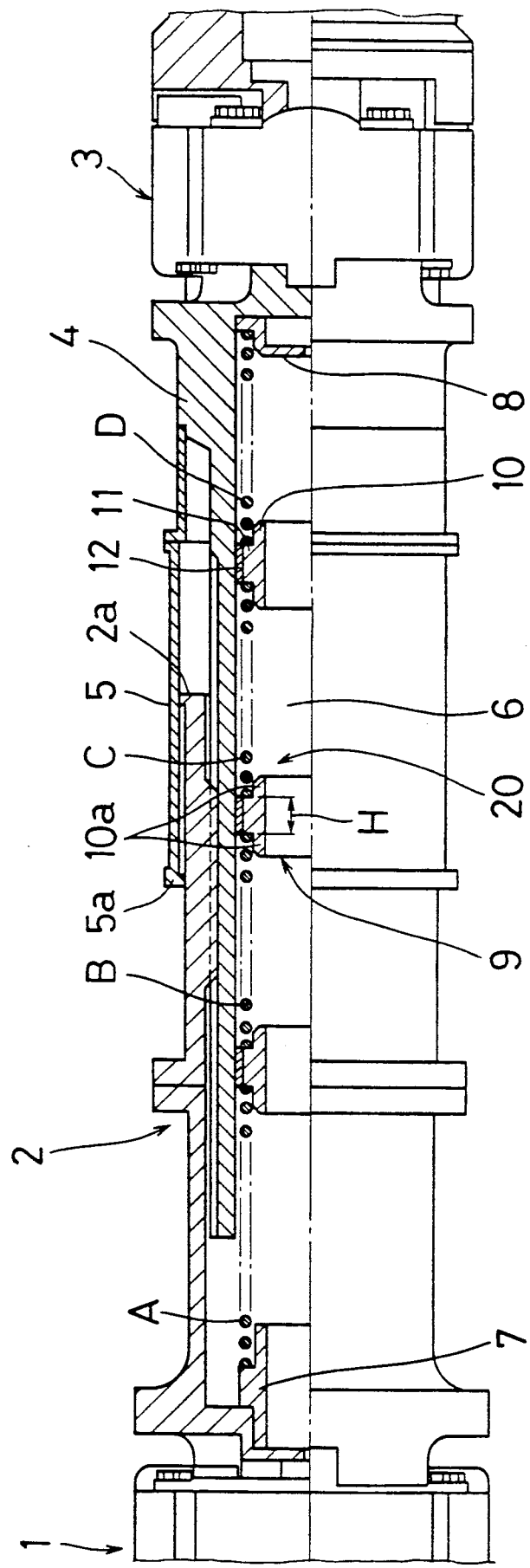
FIG. 1 is a front view, partly in vertical section, of a drive shaft according to a first embodiment of the present invention.

FIG. 1 is a front view, partly in vertical section, of a drive shaft according to a first embodiment of the present invention which is adapted for use in driving a roll of a rolling mill.

Numeral 1 is a first joint member (a drive-side joint member) whose one yoke is to be connected to a drive spindle of a drive machine not shown, the other yoke of this first joint member 1 being connected with a first tubular shaft 2 of bottomed cylindrical shape. Numeral 3 is a second joint member (a driven-side joint member) whose one yoke is to be connected to a driven spindle (not shown) in a roll neck portion of a rolling mill, the other yoke of this second joint member 3 being connected with a second tubular shaft 4 of bottomed cylindrical shape. The second tubular shaft 4 is inserted in a hollow portion of the first tubular shaft 2 or the two tubular shafts are spline-fitted/coupled with each other so that they can transfer torque and slide axially. The two joint members 1 and 3 and the two tubular shafts 2 and 4 constitute the drive shaft which functions as an expansion rotary shaft assembly.

A base portion of a cylindrical cover 5 is secured to the second tubular shaft 4 such that its end portion surrounds the outer periphery of an end portion of the first tubular shaft 2 while leaving a given gap between them, thus, this cover 5 serves not only to prevent water, dust, etc. from entering the spline-fitted section of the two tubular shafts 2 and 4, but also to prevent lubricant retained in a hollow chamber 6 defined by the two tubular shafts 2 and 4 from leaking. Further, the cover 5 is formed at its end opening with a radially-inward flange 5a and the first tubular shaft 2 is formed at its end opening with a radially-outward flange 2a. Thus, the engagement of the two flanges prevents unintended separation of the two tubular shafts 2 and 4 during, for example, the transportation of the drive shaft.

Numeral 20 is a coiled spring means which is provided in the hollow chamber 6 defined by the first tubular shaft 2 and the second tubular shaft 4. This coiled spring means 20 is composed of four coiled spring units A, B, C, and D of the same shape, and three metallic spacer members 9 of the same shape interposed between the individual spring units A, B, C and D. Each of the coiled spring units A, B, C and D is made of a coiled spring fabricated through an ordinary process. The spacer member 9 consists of a cylindrical body 10 and an annular protrusion 11 of given width H projecting radially outward from a central portion of the outer peripheral surface of the cylindrical body 10. Numeral 12 is an annular metallic member made of metal of high slidability a low co-efficient of friction, such as aluminum bronze. Each cylindrical edge portion 10a of the outer peripheral surface of the cylindrical body 10, where no annular protrusion 11 is formed, defines a receiving portion for engagement of the corresponding coiled spring unit A, B, C, D. Thus, the outer diameter of the cylindrical edge portion 10a is made smaller than the inner diameter of the second tubular shaft 4, but substantially equal to the inner diameter of the coiled spring unit A, B, C, D. Further, the outer diameter of the annular metallic member 12 is made a little smaller than the inner diameter of the second tubular shaft 4, and the difference in size between the outer diameter of the cylindrical edge portion 10a and the outer diameter of the annular metallic member 12 is made larger than the wire diameter of the coiled spring unit A, B, C, D. Consequently, even when the coiled spring means flexes, the outer periphery of the coiled spring means cannot come to contact with the inner periphery of the second tubular shaft 4.

The coiled spring means 20 is made into the form of an integral assembly by fitting one end of the coiled spring unit A with one cylindrical edge portion 10a of the corresponding spacer member 9, and by alternatingly interspacing the coiled spring units B, C and D and the spacer members 9 and similarly fitting them together. The coiled spring member 20 is radially positioned in the hollow chamber 6 after the outer peripheral surface of the annular metallic member 12 of each spacer member 9 is put in contact with the inner peripheral surface of the second tubular shaft 4. The positioning of both ends of the coiled spring means 20 is attained after the end of the coiled spring unit A is held by sleeve 7 and on the other hand, the end of the coiled spring unit D is held by a cylindrical cap 8.

In this way, the individual coiled spring units A, B, C and D are disposed in place such that their respective outer peripheral surfaces face the inner peripheral surface of the second tubular shaft 4 while keeping a given gap between them, by positioning the spacer members 9 and arranging the coiled spring units A, B, C and D such that their respective ends fit with the corresponding cylindrical edge portions 10a of the spacer members 9. As described above, the coiled spring means 20 is composed of four coiled spring units A, B, C and D. Accordingly, the individual coiled spring units A, B, C and D independently undergo flexure during the rotational motion of the drive shaft, and the amount of each flexure is limitedly small because each coiled spring unit A, B, C, D is short. Therefore, by designing the above-mentioned gap to be larger than the experimental amount of flexure of the coiled spring unit A, B, C, D, the collision of the coiled spring unit A, B, C, D with the inner peripheral surface of the second tubular shaft 4 is surely prevented, leading to no generation of vibration and noise.

Generally, the drive shaft collapses and extends axially during its rotational motion. In such a case, the spacer members 9 slide smoothly along the inner peripheral surface of the second tubular shaft 4 on the surfaces of metallic members 12.

Figure 2:
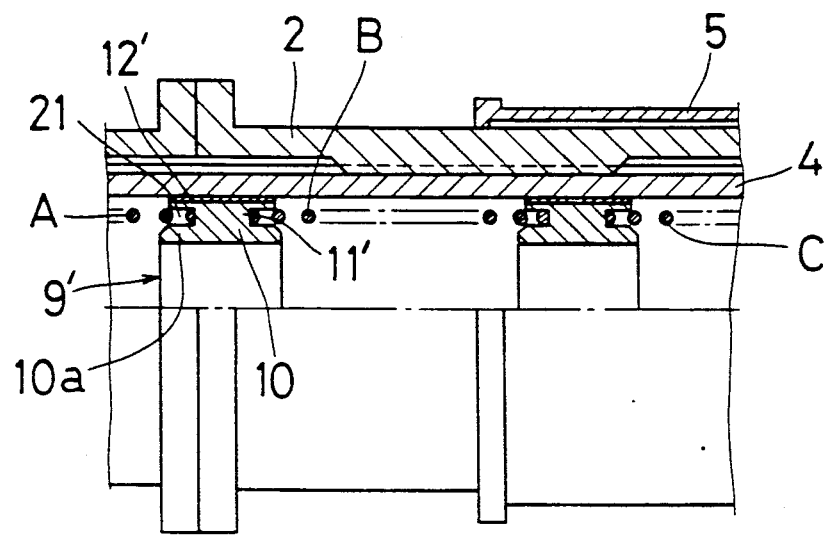
FIG. 2 is a front view, partly in vertical section, of an important portion of a drive shaft according to a second embodiment of the present invention.

FIG. 2 shows a second embodiment of the present invention. In this embodiment, the spacer member 9' is modified such that the whole outer peripheral surface of the cylindrical body 10, which has an annular metallic member 12' is feasible for contact with the inner peripheral surface of the second tubular shaft 4. With the outer peripheral surface thus widened, the spacer member 9 can be stably retained in the hollow chamber 6. In this embodiment, the cylindrical edge portion 10a of the coiled spring unit A, B, C, D is changed to an annular groove 21 formed in each side surface of the cylindrical body 10 with a connecting protrusion 11' separating such annular grooves 21. As a result, the cylindrical inner space of this annular groove 21 serves as the abovementioned cylindrical edge portion or receiving portion. Accordingly, each end of the coiled spring unit is positioned inside the corresponding annular groove 21 so that each coiled spring unit can be surely positioned radially in relation to the inner peripheral surface of the second tubular shaft 4.

Figure 3:
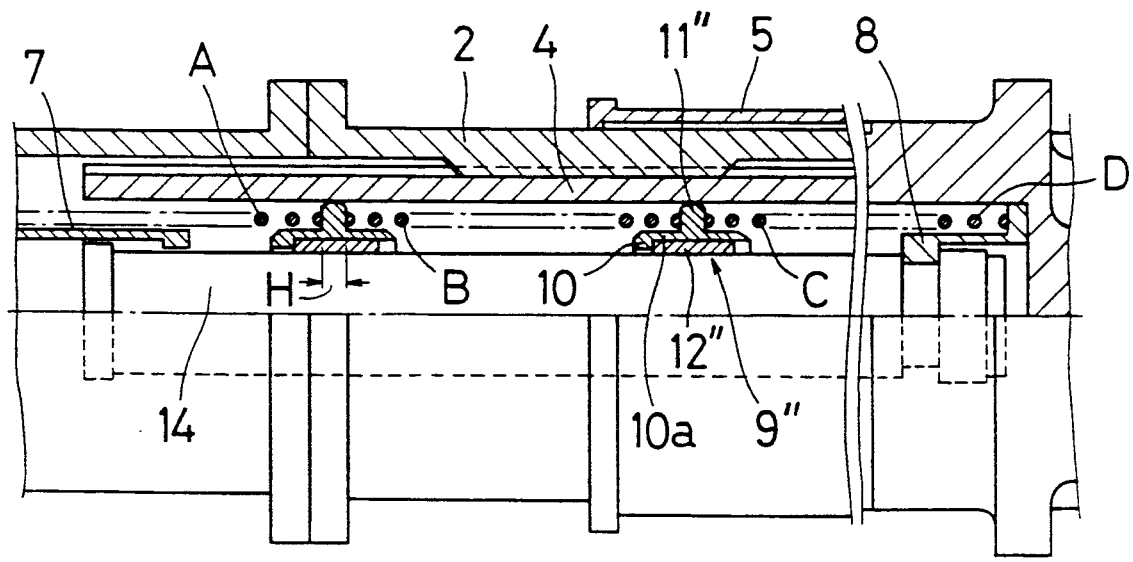
FIG. 3 is a front view, partly in vertical section, of an important portion of a drive shaft according to a third embodiment of the present invention.

FIG. 3 shows a third embodiment of the present invention. In this embodiment, each spacer member 9'' is stably fitted on a guide bar 14, and each annular metallic member 12'' has an inner peripheral surface serving as a slide surface effective with respect to the guide bar 14. Since the spacer member 9'' is stably supported by the guide bar 14, the annular protrusion 11'' is made small in width. The guide bar 14 is supported with one end secured to the cylindrical cap 8 and the other end slidably inserted in a hollow portion of the sleeve 7. Therefore, also in this embodiment, during the rotational motion of the drive shaft, the coiled spring means 20 is prevented from colliding with the inner peripheral surface of the second tubular shaft 4 and with the outer peripheral surface of the guide bar 14.

What is claimed is:

1. A drive shaft comprising a first joint member, a first tubular shaft including an inner peripheral surface, a first end portion and a second end portion, said first end portion being connected with said first joint member, a second joint member, a second tubular shaft including an inner peripheral surface, a near end portion and a far end portion, said near end portion being connected with said second joint member, said far end portion being coupled with said second end portion of said first tubular shaft to form a coupling section so as to transmit torque and slide axially, and coiled spring means provided within said coupling section for biasing said two tubular shafts in axial opposition, said coiled spring means including at least two coiled spring units and at least one spacer member, each said spacer member being interposed between adjacent coiled spring units, and each said spacer member including a cylindrical body having an inward peripheral surface and an outward peripheral surface, the outer diameter of each said spacer member being greater than the outer diameter of each said coiled spring units, said outward peripheral surface having a first and a second cylindrical edge portion and an annular protrusion projecting radially outward from a central portion of said outward peripheral surface therebetween, said annular protrusion including an outward facing peripheral surface, said outward facing peripheral surface having an outer contact portion in contact with one of said inner peripheral surfaces of one of said tubular shafts, and a first and a second receiving portion, said first and second receiving portions being defined by said first and second cylindrical edge portions, respectively, said edge portions being located on respective sides of said annular protrusion, each of said receiving portions receiving an end of each of said coiled spring units, whereby the radial movement of said coiled spring units is regulated to be kept out of contact with said inner peripheral surfaces of each of said tubular shafts forming said coupling section.

2. A drive shaft according to claim 1, further comprising a guide bar provided inside one of said tubular shafts for attachment of said coiled spring means, said guide bar having an outside peripheral surface, said inner peripheral surface of said cylindrical body of each said spacer member being in slidable contact with said outside peripheral surface of said guide bar.

3. A drive shaft according to claim 2, wherein said cylindrical body of each said spacer member includes a metallic member having a low coefficient of friction fitted on said inward peripheral surface.

4. A drive shaft comprising a first joint member, a first tubular shaft including an inner peripheral surface, a first end portion and a second end portion, said first end portion being connected with said first joint member, a second joint member, a second tubular shaft including an inner peripheral surface, a near end portion and a far end portion, said near end portion being connected with said second joint member, said far end portion being coupled with said second end portion of said first tubular shaft to form a coupling section so as to transmit torque and slide axially, and coiled spring means provided within said coupling section for biasing said two tubular shafts in axial opposition, said coiled spring means including at least two coiled spring units and at least one spacer member, each said spacer member being interposed between adjacent coiled spring units, and each said spacer member including a cylindrical body having an inward peripheral surface, an outward peripheral surface, said outward peripheral surface having an outer contact portion in contact with one of said inner peripheral surfaces of one of said tubular shafts, a first joint facing end, a second joint facing end, and a first and a second annular groove, said first and second annular grooves being formed in said first and second facing ends, respectively, a first and a second receiving portion being defined by said annular grooves, each of said receiving portions receiving an end of each of said coiled spring units, the outer diameter of each said spacer member being greater than the outer diameter of each said coiled spring units, whereby the radial movement of said coiled spring units is regulated to be kept out of contact with said inner peripheral surfaces of each of said tubular shafts forming said coupling section.

5. A drive shaft according to claim 1 or 4, wherein said outer contact portion includes a metallic member having a low coefficient of friction fitted thereon.

* * * * *